UNITED STATES PATENT OFFICE.

IGNACY MOSCICKI AND CASIMIR JABLCZYNSKI, OF FREIBURG, SWITZERLAND, ASSIGNORS TO THE FIRM OF ALUMINUM-INDUSTRIE-AKTIEN-GESELLSCHAFT, OF ZURICH, SWITZERLAND.

PROCESS OF MANUFACTURING CYANID OF HYDROGEN.

1,050,978.    Specification of Letters Patent.    Patented Jan. 21, 1913.

No Drawing.    Application filed July 7, 1910. Serial No. 570,778.

*To all whom it may concern:*

Be it known that we, IGNACY MOSCICKI and CASIMIR JABLCZYNSKI, subjects of the Czar of Russia, and residing at Freiburg, Switzerland, have invented a certain new and useful Improved Process of Manufacturing Cyanid of Hydrogen, of which the following is a specification.

This invention relates to improvements in processes of manufacturing hydrogen cyanid; and an object of this invention is to provide a process which will give a greatly increased yield of hydrogen cyanid as compared with processes heretofore known and which will, therefore, result in a reduced cost of production of hydrogen cyanid.

The synthesis of cyanid of hydrogen from nitrogen, carbureted hydrogen and hydrogen is known, owing to the work of Berthelot. At first he electrically heated a mixture of nitrogen and carbureted hydrogen, but obtained no result because the whole of the carbon set free by the decomposition of the hydrocarbon separated in the form of soot. Only by adding such a quantity of hydrogen to the gaseous mixture that the proportion of the hydrocarbons in it amounted to only approximately 10% was it possible for him to prevent the separation of carbon and to produce cyanid of hydrogen. In this process, however, the output of cyanid of hydrogen is so small that it is not adapted for the industrial manufacture of cyanid of hydrogen. Now we have found by experiment that in the synthesis of cyanid of hydrogen from a mixture of a hydrocarbon, nitrogen and hydrogen the output increases with an increase in the percentage of nitrogen in the mixture—the proportion of hydrocarbon remaining the same—and that the dilution of the hydrocarbon with hydrogen instead of with nitrogen greatly reduces the output and preferably is effected to only such an extent as appears absolutely requisite for preventing the separation of carbon. Additional experiments have shown us that, when employing more or less saturated hydrocarbons (which come into consideration principally for economical reasons), there results in addition to the synthesis of cyanid of hydrogen a decomposition of these hydrocarbons in the sense that hydrocarbons poorer in hydrogen are produced and elemental hydrogen is liberated. For economically carrying the process into practice it is necessary to subject the gaseous mixture again to the same process after the constituents of the mixture have been caused to react by great heat and after the mixture has been freed from the cyanid of hydrogen formed thereby. But if this is allowed to take place without the exercise of precautionary measures, the gaseous mixture will gradually become diluted with hydrogen and the output will decrease considerably in consequence of the diminished concentration of the nitrogen in the gaseous mixture.

Now a primary object of the process according to this invention is to prevent this result and to maintain the required high proportion of free nitrogen in the repeatedly-used gaseous mixture, while keeping therein an amount of hydrogen just sufficient to prevent deposition of soot due to separation of carbon. To this end, the prejudicially acting surplusage of hydrogen is regularly removed from the constantly-circulating gaseous mixture, and in this manner there is prevented such an accumulation of hydrogen in the same and dilution thereof thereby as would diminish in the mixture the high degree of concentration of the nitrogen which is necessary to obtain the high yield of hydrogen cyanid sought for.

We may remove the excess hydrogen from the gaseous mixture according to the following methods:

(a) The mixture of hydrogen, nitrogen and hydrocarbon is subjected to diffusion. Each gas then diffuses at an equal partial pressure with a velocity which is inversely proportional to the square root of its density. Therefore a gas which for the most part consists of hydrogen can be removed from the gaseous mixture.

(b) The hydrogen is oxidized by catalysis, the reaction being limited to the hydrogen. If air be used as oxidizing agent, nitrogen is simultaneously supplied to the gaseous mixture.

(c) The gaseous mixture is burned with a deficient quantity of oxygen, nitrogen being again supplied to the gaseous mixture by employing air as the oxidizing agent. The quantity of air supplied to the gaseous mixture is exactly sufficient to burn the excess of hydrogen contained in the mixture, which excess amounts to a few per cent. If more air were to be supplied, a part of the hydrocarbon would also be burned, which would naturally import a loss, since the carbonic acid gas thereby formed does not enter into the formation of the hydrogen cyanid, because carbonic acid gas forms no prussic acid in the presence of nitrogen and hydrogen by means of electric heating.

(d) The gaseous mixture is allowed to act on oxids, the reaction being so conducted that the reduction of the mixture is caused only by the hydrogen. This process may, by way of example, be carried out indeed so that the gaseous mixture is conducted rather rapidly over copper oxid at a faint red heat. Since the gaseous mixture contains hydrogen in large excess over the hydrocarbon, the part of the hydrogen to be gotten rid of in this way will burn; on the contrary, none of the hydrocarbon or only an infinitesimally small portion thereof will burn. Our process may, however, also be carried into practice, for example, by preliminarily heating the gaseous mixture consisting of nitrogen, hydrogen and hydrocarbon and then highly heating it electrically to a very high temperature. The hot gaseous mixture is then cooled and the cyanid of hydrogen which is formed is removed in a suitable manner. The surplus hydrogen is withdrawn by dividing the current of gas into two unequal parts. The larger part is supplied again to the reaction chamber, whereas the smaller part is supplied to a place where its energy is otherwise utilized, e. g. thermically. Instead of this separated part a corresponding mixture of nitrogen and hydrocarbon is supplied to the gaseous mixture flowing to the reaction chamber. In this manner we control the concentration of hydrogen in the gaseous mixture which passes into the electric flame, so that it never exceeds a certain limit and the high degree of concentration of the free nitrogen required for the best results and highest yield of hydrogen cyanid is constantly maintained. Further, care is also exercised that other gases (e. g. carbon monoxid, argon, etc.,) which are prejudicial to the desired reaction and which constantly pass into the gaseous mixture for various reasons, do not accumulate in such excess as to disturb the reaction; gases, such as carbon monoxid, argon and the like, are hurtful, for the reason that they, on the one hand, with nitrogen and hydrogen, or as the case may be, with carbon and hydrogen, produce no prussic acid in connection with the electric heating, and because on the other hand, if they are not removed from the gaseous mixture subjected to the cycle of operations, the degree of concentration of the working or effective constituents of the gas mixture will be diminished and in this way the yield will also be reduced. The quantity of gas mixed with the freshly supplied gases is then preliminarily heated and highly electrically heated again.

Instead of pure nitrogen, air may be present in the fresh supply of gas which to the gaseous mixture undergoing the reaction is added as a substitute for the gases which are drawn off and for those which are bound by the reaction. Since, after the division of the gaseous mixture, the larger part of the same which continues to circulate always contains an excess of hydrogen in proportion to the oxygen contained in the freshly-supplied air, the latter can burn the hydrogen to water without practically disturbing the reaction. The employment of air has, therefore, the advantage that a larger part of the hydrogen contained in the gaseous mixture is removed than when pure nitrogen is employed. Consequently, there can be a corresponding reduction in the amount of hydrocarbon which must after the electrical heating be removed from the circulating gaseous mixture in order to prevent the accumulation of hydrogen and to maintain in that way the necessary high degree of concentration of the nitrogen.

The following is given as a specific example of the carrying out of our new process: The initial or basic substance taken is a gas made from oil and having the following approximate composition:

| | |
|---|---|
| Methane | 50.3% |
| Heavy hydrocarbons (for example, acetylene, ethylene, propylene, benzene) | 22.5% |
| Hydrogen | 23.2% |
| Nitrogen | 4.0% |

This gas is mixed in such manner with pure nitrogen and hydrogen that the final mixture contains nitrogen 74 parts, hydrocarbon 10 parts, hydrogen 16 parts. This mixture in then preheated and led into an electric furnace having a revolving high-tension flame. In this a part of the gas now passes directly into the body of the flame and is there so highly heated (to a temperature of from 2500° to 3500°, centigrade) that the hydrocarbon is split up or resolved into its components and the carbon and hydrogen thus set free unite with the nitrogen to form hydrogen cyanid. The part of the gas which does not pass through the body of the flame, which is, therefore, subjected to no high heating and, hence, which is also not decomposed mixes with the highly-heated gas coming from the flame and serves to chill the latter gas. This chilling is necessary, since the hydrogen cyanid formed and contained in the highly-heated gas would again itself be decomposed; that is to say, the reaction which took place in the flame would be rendered of no effect. Since now as just stated, a decomposition of the hydrocarbon takes place in only that part of the gas which passes into the body of the flame, the furnace leaves the other part of the gas unchanged. In order, therefore, to be able to carry on the process economically, the gas, after the replenishment of the ingredients used up in the formation of the hydrogen cyanid, will again be conducted through the furnace; that is, the process is carried on in a recurring cycle of operations. Now there goes on along with the above-described decomposition of the hydrocarbon into carbon and hydrogen still another decomposition, namely, in this way, that the completely or almost completely saturated hydrocarbons (as, for example, methane, ethylene), by separation of hydrogen, change into unsaturated hydrocarbons (as, for example, acetylene). In this connection there will therefore be surplus free hydrogen, (that is, hydrogen not combined to form hydrogen cyanid) which in working in a cycle would, if precautions were not taken, accumulate soon to such an amount that the required high degree of concentration of the free nitrogen would be destroyed and that, according to the chemical law of action of substances, the yield of hydrogen cyanid would be diminished below a minimum which would no longer be profitable for an industrial use of the process. Hence, this surplus hydrogen which is newly produced in connection with each passage of the gas through the flame-arc, must every time before or after the separation of the produced hydrogen cyanid be removed. This removal is accomplished according to one of the methods set forth in the foregoing description. The separation of the hydrogen cyanid from the gaseous mixture can be so effected, for example, that the same is led into a solution of caustic potash or caustic soda, which will with the hydrogen cyanid form, respectively, potassium cyanid and sodium cyanid. After the separation of the hydrogen cyanid and the removal of the surplusage of hydrogen, hydrocarbon and also nitrogen (so far as the addition of the latter has not already been accomplished in connection with the removal of the hydrogen) will be supplied to the gaseous mixture according to the consumption of these ingredients which results from the reaction in the arc of flame, whereupon the entire process begins anew.

Suitable apparatuses for the carrying out of the hereinbefore-described process are shown and described in detail in United States Letters Patent Nos. 930,212 and 933,094; and, therefore, a description and illustration herein of a suitable apparatus is deemed unnecessary and no further allusion thereto will be made herein.

In the claims which follow, it will be understood by surplus hydrogen is meant hydrogen which is in excess of that necessary to prevent the deposition of soot and which, if not removed, would serve to dilute the gaseous mixture to such an extent that the proportion of nitrogen would be reduced below that necessary to give a high yield of hydrogen cyanid.

Having now particularly described and ascertained the nature of our said invention and in what manner the same is to be performed, we declare that what we claim is:

1. A step in the process of synthetically manufacturing cyanid of hydrogen from a repeatedly-used gaseous mixture containing nitrogen, hydrogen and hydrocarbon, comprising keeping up the strength of the gaseous mixture in nitrogen and preventing the dilution of the same with hydrogen by removing therefrom the surplus hydrogen which is evolved during the reaction.

2. A process of synthetically manufacturing cyanid of hydrogen from a gaseous mixture containing nitrogen, hydrogen and hydrocarbon, comprising highly heating the gaseous mixture and subsequently cooling the same; removing therefrom cyanid of hydrogen; keeping up the strength of the gaseous mixture in nitrogen and preventing the dilution thereof with hydrogen by removing the surplus hydrogen which is evolved during the reaction; again highly heating the residual gaseous mixture and subsequently cooling the same; removing cyanid of hydrogen; removing the surplus hydrogen which is evolved during the reaction; and repeating the operations.

3. A process of synthetically manufacturing cyanid of hydrogen from a gaseous mixture containing nitrogen, hydrogen and hydrocarbon, comprising highly heating the gaseous mixture and subsequently cooling the same; removing therefrom cyanid of hydrogen; keeping up the strength of the gaseous mixture in nitrogen and preventing the dilution thereof with hydrogen by removing the surplus hydrogen which is evolved during the reaction; supplying to the residual gaseous mixture hydrocarbon and a gas of which free nitrogen is a constituent; highly heating the gaseous mixture thus formed and subsequently cooling the same; removing cyanid of hydrogen therefrom; and repeating the operations.

4. A process of synthetically manufacturing cyanid of hydrogen from a gaseous mixture containing nitrogen, hydrogen and hydrocarbon, comprising highly heating the gaseous mixture and subsequently cooling the same; removing therefrom cyanid of hydrogen; keeping up the strength of the gaseous mixture in nitrogen and preventing the dilution thereof with hydrogen by removing the surplus hydrogen which is evolved during the reaction; supplying to the residual gaseous mixture air and a hydrocarbon; highly heating the gaseous mixture thus formed and subsequently cooling the same; removing cyanid of hydrogen therefrom; and repeating the operations.

5. A process of manufacturing hydrogen cyanid comprising heating a gaseous mixture containing nitrogen, hydrogen and hydrocarbon; cooling the mixture; removing therefrom the cyanid of hydrogen formed; dividing the residue into parts; mixing with one of these parts hydrocarbon and a gas of which free nitrogen is a constituent; and subjecting the mixture last formed to the same steps as the original gaseous mixture was subjected to.

6. A process of manufacturing hydrogen cyanid comprising highly heating a gaseous mixture containing nitrogen, hydrogen and hydrocarbon; cooling the mixture; removing therefrom the hydrogen cyanid formed; dividing the residue into parts; mixing with one of these parts air and hydrocarbon; and subjecting the mixture last formed to the same steps as the original gaseous mixture was subjected to.

In testimony whereof, we affix our signatures in the presence of two witnesses.

IGNACY MOSCICKI.
CASIMIR JABLCZYNSKI.

Witnesses:
   Friedrich Narzsli,
   Friedrich Lutz.